United States Patent [19]

Arakawa

[11] Patent Number: 5,661,306
[45] Date of Patent: Aug. 26, 1997

[54] STIMULABLE PHOSPHOR SHEET

[75] Inventor: Satoshi Arakawa, Kanagawa-ken, Japan

[73] Assignee: Fuji Photo Film Co., Ltd., Kanagawa, Japan

[21] Appl. No.: 504,245

[22] Filed: Jul. 19, 1995

[30] Foreign Application Priority Data

Oct. 12, 1994 [JP] Japan ................................. 6-246222

[51] Int. Cl.$^6$ ........................................... G03B 42/00
[52] U.S. Cl. ....................... 250/484.4; 250/486.1; 250/487.1; 250/488.1; 250/583
[58] Field of Search ................. 250/488.1, 487.1, 250/486.1, 484.4, 583

[56] References Cited

U.S. PATENT DOCUMENTS

| | | |
|---|---|---|
| 4,851,679 | 7/1989 | Tamura et al. |
| 4,855,598 | 8/1989 | Ohgoda et al. |
| 5,066,864 | 11/1991 | Brandner et al. .................. 250/484.4 |

FOREIGN PATENT DOCUMENTS

| | | |
|---|---|---|
| 3-238441 | 10/1991 | Japan . |
| 6-130197 | 5/1994 | Japan . |

*Primary Examiner*—Constantine Hannaher
*Attorney, Agent, or Firm*—Sughrue, Mion, Zinn, Macpeak & Seas

[57] ABSTRACT

A stimulable phosphor sheet comprises an energy distribution separating layer, which contains a heavy metal compound capable of absorbing low energy components of radiation, and stimulable phosphor layers, which are overlaid respectively on the two surfaces of the energy distribution separating layer. When each of the stimulable phosphor layers is exposed to stimulating rays, it emits light in proportion to the amount of energy stored thereon during its exposure to radiation. The energy distribution separating layer is colored with a coloring material, which has characteristics such that it may transmit the stimulating rays and may absorb the light emitted by each of the stimulable phosphor layers.

3 Claims, 2 Drawing Sheets

STIMULABLE PHOSPHOR SHEET

BACKGROUND OF THE INVENTION

1. Field of the Invention

This invention relates to a stimulable phosphor sheet. This invention particularly relates to a stimulable phosphor sheet for use in an energy subtraction processing method for radiation images.

2. Description of the Prior Art

It has been proposed to use stimulable phosphors in radiation image recording and read-out methods and apparatuses. Specifically, a radiation image of an object, such as a human body, is recorded on a stimulable phosphor sheet, which comprises a substrate and a layer of a stimulable phosphor overlaid on the substrate. The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. After the image signal has been detected from the stimulable phosphor sheet, the stimulable phosphor sheet is exposed to erasing light or heat, and energy remaining on the stimulable phosphor sheet is thereby released.

The image signal, which has been obtained with a radiation image read-out method, or the like, is then subjected to image processing, such as gradation processing or frequency processing, such that a visible radiation image having good image quality can be reproduced and used as an effective tool in, particularly, the accurate and efficient diagnosis of an illness. The image signal, which has been obtained from the image processing, is then reproduced as a visible image on photographic film or on a cathode ray tube (CRT) display device and used in making a diagnosis, or the like. The stimulable phosphor sheet, from which the image signal has been detected, is exposed to erasing light or heat, and energy remaining on the stimulable phosphor sheet is released. The erased stimulable phosphor sheet can then be used again for the recording of a radiation image.

Also, techniques for carrying out subtraction processing on radiation images have heretofore been known. When subtraction processing is to be carried out, a plurality of (basically, two) radiation images recorded under different conditions are photoelectrically read out, and digital image signals, which represent the radiation images, are thereby obtained. The image signal components of the digital image signals, which image signal components represent corresponding picture elements in the radiation images, are then subtracted from each other, and a difference signal is thereby obtained which represents the image of a specific structure or part of the object represented by the radiation images. With the subtraction processing method, the plurality of digital image signals are subtracted from each other in order to obtain a difference signal, and the radiation image of a specific structure, which has radiation energy absorption characteristics different from the radiation energy absorption characteristics of the other parts of the object, can be reproduced from the difference signal.

With regard to the subtraction processing, the applicant proposed a stimulable phosphor sheet comprising a substrate, which is constituted of a substance capable of absorbing low energy components of radiation (an energy distribution separating layer), and stimulable phosphor layers, which are overlaid respectively on the two surfaces of the substrate. Such a stimulable phosphor sheet is disclosed in, for example, U.S. Pat. No. 4,855,598. In cases where the proposed stimulable phosphor sheet is exposed to radiation carrying image information of an object, radiation images of the object are stored respectively on the two stimulable phosphor layers. On the stimulable phosphor layer, which is located on the side opposite to the object side, a radiation image is stored with the radiation, in which the low energy components have been reduced to an amount smaller than the amount of the low energy components contained in the radiation impinging upon the stimulable phosphor layer located on the object side. Stimulating rays are then irradiated to the two surfaces of the stimulable phosphor sheet or to only either one of the two surfaces of the stimulable phosphor sheet. Light emitted by one of the two surfaces of the stimulable phosphor sheet and light emitted by the other surface of the stimulable phosphor sheet are photoelectrically detected, and two image signals are thereby obtained. The subtraction process is then carried out on the two image signals. In this manner, a subtraction image can be efficiently obtained with a single image recording operation.

In cases where the stimulating rays are thus irradiated to only either one surface of the stimulable phosphor sheet and the two image signals are respectively obtained from the two stimulable phosphor layers overlaid on opposite sides of the substrate, it is necessary that the stimulating rays also stimulate the stimulable phosphor layer, which is located on the other surface of the stimulable phosphor sheet. Therefore, it is necessary for the substrate to be constituted of a material, which is capable of transmitting the stimulating rays. Such a requirement is described in, for example, Japanese Unexamined Patent Publication No. 6(1994)-130197.

In cases where the light emitted by one of the two surfaces of the stimulable phosphor sheet and the light emitted by the other surface of the stimulable phosphor sheet are detected respectively, two image signals being thereby obtained, and a subtraction image is obtained from the two image signals, the problems described below occur. Specifically, when an image signal is detected on either surface side of the stimulable phosphor sheet, the light, which has been emitted by the stimulable phosphor layer located on the opposite surface side of the stimulable phosphor sheet, passes through the substrate towards the surface side of the stimulable phosphor sheet, on which side the detection of the image signal is being carried out. Therefore, the light, which has been emitted by the stimulable phosphor layer located on the opposite surface side of the stimulable phosphor sheet, is mixed into the light emitted by the stimulable phosphor layer located on the surface side of the stimulable phosphor sheet, on which side the detection of the image signal is being carried out. As a result, the problems occur in that the radiation image, which has been stored on the stimulable phosphor layer located on one of the two surface sides of the stimulable phosphor sheet, and the radiation image, which has been stored on the stimulable phosphor layer located on the other surface side of the stimulable phosphor sheet, cannot be accurately separated from each other, and a subtraction image having a high signal-to-noise ratio cannot be obtained.

SUMMARY OF THE INVENTION

The primary object of the present invention is to provide a stimulable phosphor sheet, wherein a single stimulable phosphor sheet is capable of storing two radiation images with radiation having different energy distributions and with a single, simultaneous exposure to radiation, and wherein the two radiation images for use in subtraction processing are capable of being read out respectively from the two surface sides of the stimulable phosphor sheet with a single irradiation of stimulating rays to one surface of the stimulable phosphor sheet, such that the two radiation images having been read out may be accurately separated from each other.

Another object of the present invention is to provide a stimulable phosphor sheet, which enables a subtraction image to be obtained with a high signal-to-noise ratio.

The present invention provides a first stimulable phosphor sheet comprising:

i) an energy distribution separating layer, which contains a heavy metal compound capable of absorbing low energy components of radiation, and ii) stimulable phosphor layers, which are overlaid respectively on the two surfaces of the energy distribution separating layer, and each of which emits light in proportion to the amount of energy stored thereon during its exposure to radiation when it is exposed to stimulating rays, wherein the energy distribution separating layer is colored with a coloring material, which has characteristics such that it may transmit the stimulating rays and may absorb the light emitted by each of the stimulable phosphor layers.

When each of the stimulable phosphor layers is exposed to the stimulating rays, it emits light in proportion to the amount of energy stored thereon during its exposure to radiation. The light emitted by one of the stimulable phosphor layers and the light emitted by the other stimulable phosphor layer may be photoelectrically converted into image signals, which represent the radiation images stored respectively on the stimulable phosphor layers. The image signals may then be converted into digital image signals, and the image signal components of the digital image signals, which represent corresponding picture elements in the radiation images, may then be subtracted from each other. Specifically, the image signal components of the digital image signals, which represent corresponding picture elements in the radiation images, may be multiplied by weight factors and thereafter subtracted from each other. In this manner, a new image signal representing a subtraction image can be obtained.

As the coloring material, for example, in cases where light of a red region is used as the stimulating rays and each of the stimulable phosphor layers emits light of a blue region when it is exposed to the stimulating rays, it is possible to use Oil Yellow, which transmits light of the red region and absorbs light of the blue region.

As the heavy metal compound, it is possible to use lead carbonate, bismuth oxide, a lanthanoid oxide, or the like.

A substrate layer or a protective layer may be overlaid on the outer surface of either one of the two stimulable phosphor layers. In such cases, the substrate layer serves to support the stimulable phosphor sheet and is constituted of a transparent material, which at least transmits the light emitted by the stimulable phosphor layer. Also, the protective layer serves to protect the surface of the stimulable phosphor layer from scratching and soil and is constituted of a transparent material, which at least transmits the light emitted by the stimulable phosphor layer.

The present invention also provides a second stimulable phosphor sheet comprising:

i) an energy distribution separating layer, which contains a heavy metal compound capable of absorbing low energy components of radiation, and ii) stimulable phosphor layers, which are overlaid respectively on the two surfaces of the energy distribution separating layer, and each of which emits light in proportion to the amount of energy stored thereon during its exposure to radiation when it is exposed to stimulating rays, wherein the energy distribution separating layer comprises a heavy metal-containing glass, which is capable of absorbing the low energy components of radiation, and a multi-layer film filter, which is capable of transmitting the stimulating rays and reflecting the light emitted by each stimulable phosphor layer, and which is overlaid on the heavy metal-containing glass.

The multi-layer film filter may be overlaid on only one surface of the heavy metal-containing glass. Alternatively, two multi-layer film filters may be respectively overlaid on the two surface sides of the heavy metal-containing glass. As the heavy metal-containing glass, rare earth element-containing glass, or the like, may be used. The heavy metal-containing glass may also serve as a substrate for the stimulable phosphor sheet. Also, as in the first stimulable phosphor sheet in accordance with the present invention, a substrate layer, which is constituted of the transparent material, or a protective layer, which is constituted of the transparent material, may be overlaid on the outer surface of either one of the two stimulable phosphor layers.

With the first stimulable phosphor sheet in accordance with the present invention, the energy distribution separating layer, which contains a heavy metal compound capable of absorbing the low energy components of radiation, is interleaved between the two stimulable phosphor layers. Therefore, when the stimulable phosphor sheet is exposed to radiation carrying image information of an object containing a specific structure, which has radiation energy absorption characteristics different from the radiation energy absorption characteristics of the other parts of the object, a radiation image is stored on the stimulable phosphor layer, which stands facing the object, with the original radiation carrying the image information of the object. Also, a radiation image is stored on the stimulable phosphor layer, which is located on the side opposite to the object, with the radiation in which the low energy components have been reduced by the energy distribution separating layer. In this manner, two radiation images for use in an energy subtraction processing method can be stored on a single stimulable phosphor sheet with two kinds of radiation having different energy distributions and with a single, simultaneous exposure to radiation.

Thereafter, the stimulating rays are irradiated to one surface side of the stimulable phosphor sheet, on which the two radiation images have been stored. From the surface of the stimulable phosphor sheet, to which the stimulating rays are irradiated, light is emitted in proportion to the amount of energy stored on the stimulable phosphor layer located on the surface side of the stimulable phosphor sheet, to which the stimulating rays are irradiated. Specifically, from the surface of the stimulable phosphor sheet, which stood facing the object side during the image recording operation, light is emitted in proportion to the amount of energy stored on the stimulable phosphor layer during its exposure to the original radiation, in which the low energy components have not been reduced. Also, from the surface of the stimulable phosphor sheet, which was located on the side opposite to the object during the image recording operation, light is emitted in proportion to the amount of energy stored on the stimulable phosphor layer during its exposure to the radiation, in which the low energy components have been reduced.

The stimulating rays, which have been irradiated to one surface side of the stimulable phosphor sheet, pass through the stimulable phosphor layer, which is located on the stimulating ray irradiation side. Thereafter, the stimulating rays pass through the energy distribution separating layer, and impinge upon the stimulable phosphor layer, which is located on the side opposite to the stimulating ray irradiation side. During the exposure to the stimulating rays, each of the stimulable phosphor layer, which is located on the stimulating ray irradiation side, and the stimulable phosphor layer, which is located on the side opposite to the stimulating ray irradiation side, emits light in proportion to the amount of energy stored thereon during its exposure to the radiation. The light thus emitted is photoelectrically detected. At this time, the light emitted by the stimulable phosphor layer, which is located on the side opposite to the stimulating ray irradiation side, also propagates towards the energy distribution separating layer. However, the energy distribution separating layer is colored with the coloring material, which has characteristics such that it may transmit the stimulating rays and may absorb the light emitted by each of the stimulable phosphor layers. Therefore, the light emitted by the stimulable phosphor layer, which is located on the side opposite to the stimulating ray irradiation side, is absorbed by the energy distribution separating layer and does not impinge upon the stimulable phosphor layer, which is located on the stimulating ray irradiation side. Also, the emitted light having propagated from the stimulable phosphor layer, which is located on the stimulating ray irradiation side, towards the energy distribution separating layer is absorbed by the energy distribution separating layer and does not impinge upon the stimulable phosphor layer, which is located on the side opposite to the stimulating ray irradiation side. Accordingly, the two radiation images for use in the subtraction processing can be read out respectively from the two surface sides of the stimulable phosphor sheet with a single irradiation of stimulating rays to one surface of the stimulable phosphor sheet, such that the two radiation images having been read out may be accurately separated from each other. As a result, a subtraction image can be obtained with a high signal-to-noise ratio.

With the second stimulable phosphor sheet in accordance with the present invention, by the same effects as those in the first stimulable phosphor sheet in accordance with the present invention, two radiation images for use in the energy subtraction processing method can be stored on a single stimulable phosphor sheet with two kinds of radiation having different energy distributions and with a single, simultaneous exposure to radiation.

Thereafter, the stimulating rays are irradiated to one surface side of the stimulable phosphor sheet, on which the two radiation images have been stored. In this manner, by the same effects as those in the first stimulable phosphor sheet in accordance with the present invention, from the surface of the stimulable phosphor sheet, to which the stimulating rays are irradiated, light is emitted in proportion to the amount of energy stored on the stimulable phosphor layer located on the surface side of the stimulable phosphor sheet, to which the stimulating rays are irradiated. Also, from the surface of the stimulable phosphor sheet located on the side opposite to the surface, to which the stimulating rays are irradiated, light is emitted in proportion to the amount of energy stored on the stimulable phosphor layer located on the surface side of the stimulable phosphor sheet opposite to the surface side, to which the stimulating rays are irradiated.

The light emitted by one of the stimulable phosphor layers and the light emitted by the other stimulable phosphor layer also propagate towards the energy distribution separating layer, which comprises the heavy metal-containing glass and the multi-layer film filter overlaid on the heavy metal-containing glass. However, the light emitted by one of the stimulable phosphor layers is reflected by the multi-layer film filter and does not impinge upon the other stimulable phosphor layer. Also, the light emitted by the other stimulable phosphor layer is reflected by the multi-layer film filter and does not impinge upon the aforesaid one of the stimulable phosphor layers. Therefore, the two radiation images for use in the subtraction processing can be read out respectively from the two surface sides of the stimulable phosphor sheet with a single irradiation of stimulating rays to one surface of the stimulable phosphor sheet, such that the two radiation images having been read out may be accurately separated from each other. As a result, a subtraction image can be obtained with a high signal-to-noise ratio.

DESCRIPTION OF THE PREFERRED EMBODIMENTS

The present invention will hereinbelow be described in further detail with reference to the accompanying drawings.

Figure 1:
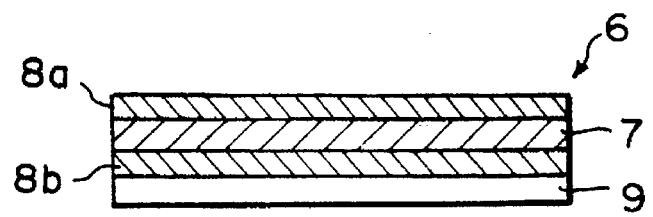
FIG. 1 is a sectional view showing a first embodiment of the stimulable phosphor sheet in accordance with the present invention.

FIG. 1 is a sectional view showing a first embodiment of the stimulable phosphor sheet in accordance with the present invention. With reference to FIG. 1, a stimulable phosphor sheet 6 comprises stimulable phosphor layers 8a and 8b, an intermediate layer 7 serving as an energy distribution separating layer, and a transparent substrate 9. The stimulable phosphor layer 8b, the intermediate layer 7, and the stimulable phosphor layer 8a are overlaid in this order on the transparent substrate 9. When the stimulable phosphor layers 8a and 8b are exposed to radiation carrying image information of an object, they store the radiation images of the object. When each of the stimulable phosphor layers 8a and 8b is exposed to a laser beam serving as the stimulating rays, it emits light in proportion to the amount of energy stored thereon during its exposure to the radiation. The intermediate layer 7 serving as the energy distribution separating layer comprises a polymer binder and powder of a heavy metal compound, which is dispersed in the polymer binder and is capable of absorbing the low energy components of the radiation. The mixture of the polymer binder and the powder of the heavy metal compound is formed in a thin film shape. The polymer binder is colored with Oil Yellow, which has characteristics such that it may transmit the (red) laser beam and may absorb the (blue) light emitted by the stimulable phosphor layers 8a and 8b. The heavy metal compound may be lead carbonate, bismuth oxide, a lanthanoid oxide, or the like. The transparent substrate 9 for supporting the stimulable phosphor layers 8a and 8b and the intermediate layer 7 absorbs the laser beam and transmits the light emitted by the stimulable phosphor layers 8a and 8b.

Figure 2:
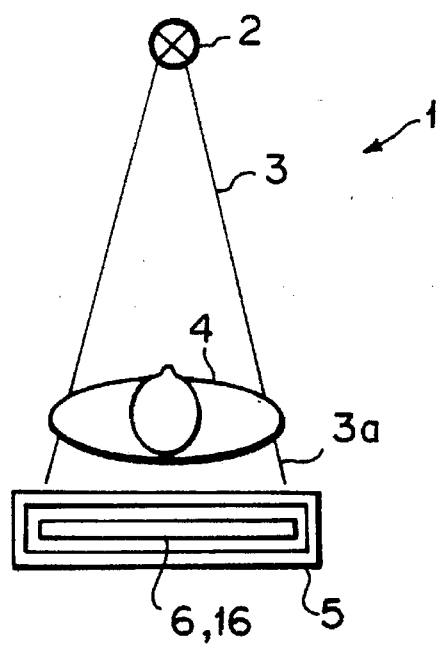
FIG. 2 is a schematic view showing an example of an X-ray image recording apparatus.

FIG. 2 is a schematic view showing an example of an X-ray image recording apparatus.

In an X-ray image recording apparatus 1 shown in FIG. 2, an X-ray source 2 and a cassette 5, in which a stimulable phosphor sheet 6 is housed, stand facing each other. An object 4 containing a specific structure, which has radiation energy absorption characteristics different from the radiation energy absorption characteristics of the other parts of the object, intervenes between the X-ray source 2 and the cassette 5. The stimulable phosphor sheet 6 is located in the cassette 5 such that the stimulable phosphor layer 8a may stand facing the object 4 (i.e. facing the upper side in FIG. 2) and the substrate 9 may stand facing the side opposite to the object 4 (i.e. facing the lower side in FIG. 2).

X-rays 3 are produced by the X-ray source 2. The X-rays 3 pass through the object 4 containing a specific structure, which has radiation energy absorption characteristics different from the radiation energy absorption characteristics of the other parts of the object 4. X-rays 3a, which have passed through the object 4, impinge upon the stimulable phosphor layer 8a, which is located on the upper surface side of the stimulable phosphor sheet 6. In this manner, an X-ray image of the object 4 is stored on the stimulable phosphor layer 8a. The X-rays 3a further pass through the stimulable phosphor layer 8a and impinge upon the intermediate layer 7 serving as the energy distribution separating layer. While the X-rays 3a are passing through the intermediate layer 7, the low energy components of the X-rays 3a are absorbed and reduced by the intermediate layer 7. As a result, the X-rays 3a now have an energy distribution, in which the high energy components have been emphasized. Thereafter, the X-rays 3a, which have passed through the intermediate layer 7, impinge upon the stimulable phosphor layer 8b. Therefore, an X-ray image of the object 4 is stored on the stimulable phosphor layer 8b with the X-rays 3a, in which the low energy components have been reduced. In this manner, two X-ray images, in which different images of the specific structure of the object 4 are embedded, are approximately simultaneously stored on the two stimulable phosphor layers 8a and 8b.

Figure 3:
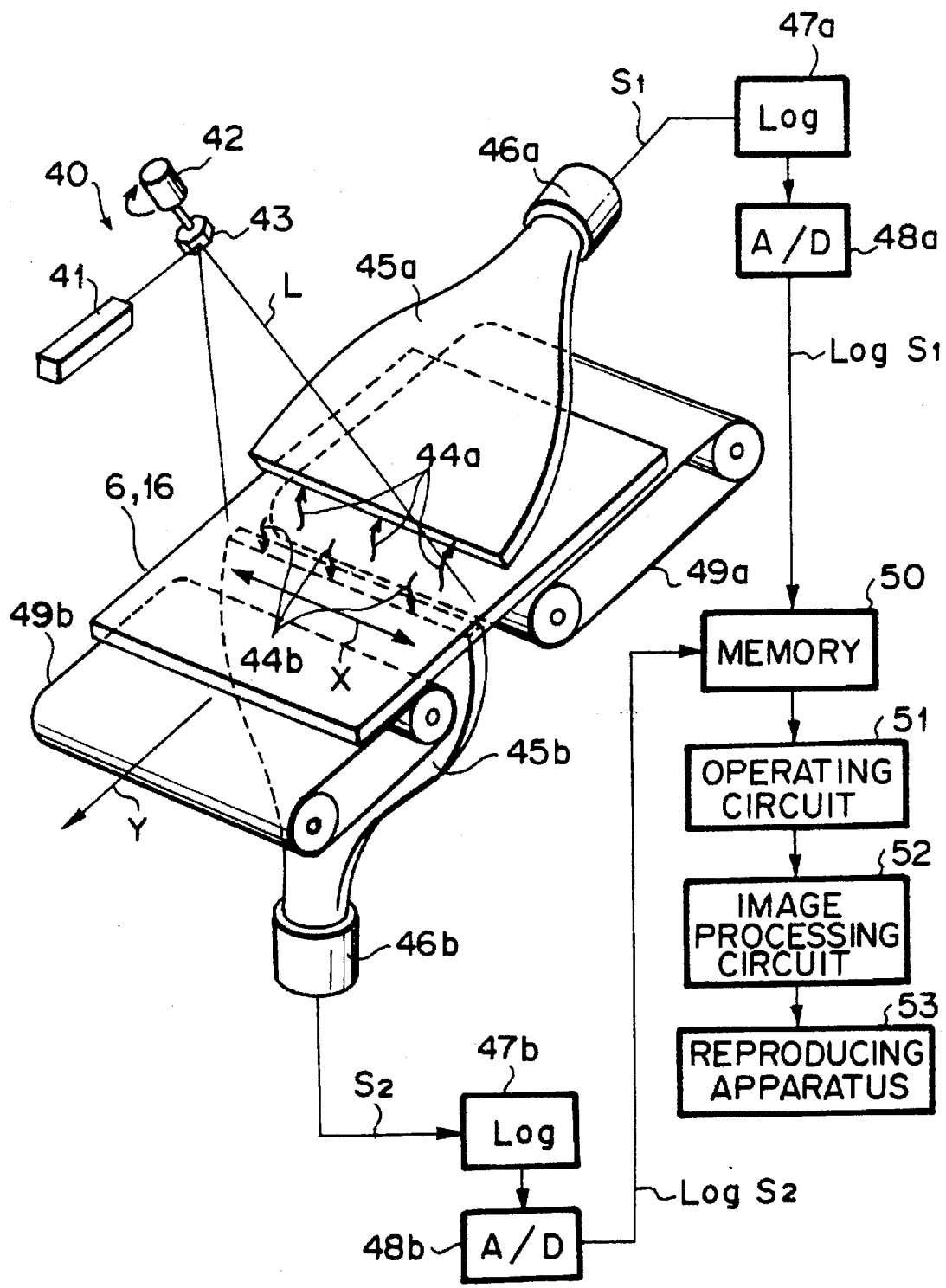
FIG. 3 is a schematic view showing an example of an X-ray image read-out apparatus.

FIG. 3 is a schematic view showing an example of an X-ray image read-out apparatus 40 for reading out the X-ray images from the stimulable phosphor sheet 6, on which the X-ray images have been stored in the manner described above.

With reference to FIG. 3, the stimulable phosphor sheet 6 is placed on endless belts 49a and 49b such that the stimulable phosphor layer 8a may face up. The endless belts 49a and 49b are rotated by motors (not shown). A laser beam source 41, a rotating polygon mirror 43, and a motor 42 are located above the stimulable phosphor sheet 6. The laser beam source 41 produces a laser beam L serving as stimulating rays, which cause the stimulable phosphor sheet 6 to emit light in proportion to the amount of energy stored thereon during its exposure to the X-rays. The laser beam L is capable of passing through the intermediate layer 7 of the stimulable phosphor sheet 6. The rotating polygon mirror 43 reflects and deflects the laser beam L, which has been produced by the laser beam source 41. The motor 42 rotates the rotating polygon mirror 43 such that the laser beam L having been reflected and deflected by the rotating polygon mirror 43 may scan the stimulable phosphor sheet 6 in main scanning directions, which are indicated by the double headed arrow X. A light guide member 45a is located above and close to the position on the stimulable phosphor sheet 6 which is being scanned with the laser beam L. The light guide member 45a collects light 44a, which is emitted from the upper surface side of the stimulable phosphor sheet 6 when the stimulable phosphor sheet 6 is scanned with the laser beam L, from above the stimulable phosphor sheet 6. Also, a light guide member 45b is located below the position on the lower surface of the stimulable phosphor sheet 6 which is being scanned with the laser beam L. The light guide member 45b is located perpendicularly to the stimulable phosphor sheet 6 and collects light 44b, which is emitted from the lower surface side of the stimulable phosphor sheet 6 when the stimulable phosphor sheet 6 is scanned with the laser beam L, from below the stimulable phosphor sheet 6. The light guide member 45a is located such that it may be in close contact with a photomultiplier 46a, which photoelectrically detects the light 44a emitted by the stimulable phosphor sheet 6. Also, the light guide member 45b is located such that it may be in close contact with a photomultiplier 46b, which photoelectrically detects the light 44b emitted by the stimulable phosphor sheet 6. The photomultipliers 46a and 46b are respectively connected to logarithmic amplifiers 47a and 47b. The logarithmic amplifiers 47a and 47b are respectively connected to analog-to-digital converters 48a and 48b. The analog-to-digital converters 48a and 48b are connected to a memory 50.

How the X-ray images are read out from the stimulable phosphor sheet 6 in the X-ray image read-out apparatus 40 will be described hereinbelow with reference to FIG. 3. In the X-ray image recording apparatus shown in FIG. 2, the X-ray images of the object 4 are stored on the stimulable phosphor sheet 6. The stimulable phosphor sheet 6, on which the X-ray images have been stored, is set at a predetermined position on the endless belts 49a and 49b such that the stimulable phosphor layer 8a may face up. The stimulable phosphor sheet 6, which has been set at the predetermined position, is conveyed by the endless belts 49a and 49b in a sub-scanning direction indicated by the arrow Y. Also, the laser beam L is produced by the laser beam source 41. The laser beam L, which has been produced by the laser beam source 41, is reflected and deflected by the rotating polygon mirror 43, which is quickly rotated by the motor 42 in the direction indicated by the arrow. The laser beam L, which has thus been reflected and deflected by the rotating polygon mirror 43, impinges upon the stimulable phosphor sheet 6 and scans it in the main scanning directions indicated by the double headed arrow X. The main scanning directions are approximately normal to the sub-scanning direction indicated by the arrow Y. Therefore, the entire area of the stimulable phosphor sheet 6 is exposed to the laser beam L.

The laser beam L, which has been irradiated to the stimulable phosphor sheet 6, impinges upon and stimulates the stimulable phosphor layer 8a of the stimulable phosphor sheet 6. When the stimulable phosphor layer 8a is exposed to the laser beam L, the exposed portion of the stimulable phosphor sheet 6 emits the light 44a in proportion to the amount of energy stored thereon during its exposure to the X-rays. The laser beam L passes through the stimulable phosphor layer 8a and impinges upon the intermediate layer 7. The intermediate layer 7 has the characteristics such that it may transmit the (red) laser beam L. Therefore, the laser beam L passes through the intermediate layer 7 and impinges upon the stimulable phosphor layer 8b. The stimulable phosphor layer 8b is stimulated by the laser beam L, which has passed through the stimulable phosphor layer 8a and the intermediate layer 7. As a result, the stimulable phosphor layer 8b emits the light 44b in proportion to the amount of energy stored thereon during its exposure to the X-rays.

On the stimulable phosphor layer 8b, the X-ray image has been stored with the X-rays, in which the low energy components have been reduced to an amount smaller than the amount of the low energy components contained in the X-rays impinging upon the stimulable phosphor layer 8a.

Therefore, the amount of the emitted light 44a and the amount of the emitted light 44b are different from each other at least at the portion corresponding to the specific structure of the object 4.

The light 44a and the light 44b are emitted from the surfaces of the stimulable phosphor layer 8a and the stimulable phosphor layer 8b and propagate towards the region inside of the stimulable phosphor sheet 6. However, the intermediate layer 7 containing Oil Yellow absorbs the blue emitted light 44a and the blue emitted light 44b. Therefore, the light 44a having been emitted by the stimulable phosphor layer 8a does not impinge upon the stimulable phosphor layer 8b. Also, the light 44b having been emitted by the stimulable phosphor layer 8b does not impinge upon the stimulable phosphor layer 8a. In this manner, the emitted light 44a and the emitted light 44b can be separated from each other.

The light 44a having been emitted by the stimulable phosphor layer 8a is guided by the light guide member 45a, which is located on the side of the stimulable phosphor layer 8a. The emitted light 44a, which has thus been guided by the light guide member 45a, is photoelectrically detected by the photomultiplier 46a. The light guide member 45a is made from a light guiding material, such as an acrylic plate. The light guide member 45a has a linear input end face, which is located such that it may extend along the main scanning line on the stimulable phosphor sheet 6, and a ring-like output end face, which is located such that it may be in close contact with a light receiving face of the photomultiplier 46a. The emitted light 44a, which has entered from the input end face into the light guide member 45a, is guided through repeated total reflection inside of the light guide member 45a, emanates from the output end face, and is received by the photomultiplier 46a. The amount of the emitted light 44a representing the X-ray image is converted by the photomultiplier 46a into an electric signal.

The light 44b having been emitted by the stimulable phosphor layer 8b passes through the substrate 9 and is guided by the light guide member 45b, which is located on the side of the substrate 9. In the same manner as that in the emitted light 44a, the emitted light 44b, which has thus been guided by the light guide member 45b, is photoelectrically detected by the photomultiplier 46b.

The laser beam L, which has impinged upon the stimulable phosphor layer 8b, is absorbed by the substrate 9 and does not impinge upon the light guide member 45b.

The photomultiplier 46a generates an analog output signal $S_1$. The analog output signal $S_1$ is logarithmically amplified by the logarithmic amplifier 47a and is then digitized by an analog-to-digital converter 48a into a first image signal log $S_1$. The first image signal log $S_1$ is fed into the memory 50. Also, the photomultiplier 46b generates an analog output signal $S_2$. The analog output signal $S_2$ is logarithmically amplified by the logarithmic amplifier 47b and is then digitized by an analog-to-digital converter 48b into a second image signal log $S_2$. The first image signal log $S_1$ and the second image signal log $S_2$ are temporarily stored in the memory 50.

Thereafter, the first image signal log $S_1$ and the second image signal log $S_2$ are read from the memory 50 and fed into a subtraction operating circuit 51.

The subtraction operating circuit 51 carries out exponential conversion on the first image signal log $S_1$ and the second image signal log $S_2$ and restores the image signals $S_1$ and $S_2$. The image signals $S_1$ and $S_2$ are weighted with appropriate weight factors. The image signal components of the weighted image signals $S_1$ and $S_2$, which image signal components represent corresponding picture elements in the X-ray images, are then subtracted from each other. In this manner, a digital difference signal Ssub is calculated with the formula $$Ssub = a \cdot S_1 - b \cdot S_2 + c$$

wherein a and b represent the weight factors, and c represents the bias component. In an image processing circuit 52, the difference signal Ssub is again logarithmically converted and subjected to image processing, such as gradation processing or frequency processing. The difference signal Ssub, which has been obtained from the image processing circuit 52, is fed into an image reproducing apparatus 53, which is connected to the X-ray image read-out apparatus 40. In the image reproducing apparatus 53, the difference signal Ssub is used for reproducing a visible X-ray image. The image reproducing apparatus 53 may be constituted of a display means, such as a CRT display device, or a light beam scanning recording apparatus for recording an image on photographic film. The image reproducing apparatus 53 may be replaced by an apparatus for storing the image signal in an image file on an optical disk, a magnetic disk, or the like, such that the image signal may then be fed into the display means or the light beam scanning recording apparatus.

In this embodiment, the digital image signal is processed as logarithmic values. In such cases, the band compression of the image signal can be effected, and unnecessary image information can be removed perfectly. Alternatively, the same processing may be carried out on the original image signal, which has not been converted into logarithmic values.

In cases where the weight factors a and b, which are used in the subtracting operation, are set appropriately, the difference signal Ssub, in which the signal components corresponding to parts other than the specific structure in the object have been erased, can be obtained. Therefore, a radiation image of only the specific structure of the object can be reproduced from the difference signal Ssub.

As described above, with this embodiment of the stimulable phosphor sheet in accordance with the present invention, two radiation images for use in the energy subtraction processing method can be stored on a single stimulable phosphor sheet with two kinds of radiation having different energy distributions and with a single, simultaneous exposure to radiation. Also, the two radiation images for use in the subtraction processing can be read out respectively from the two surface sides of the stimulable phosphor sheet with a single irradiation of stimulating rays to one surface of the stimulable phosphor sheet, such that the two radiation images having been read out may be accurately separated from each other.

A second embodiment of the stimulable phosphor sheet in accordance with the present invention will be described hereinbelow.

Figure 4:
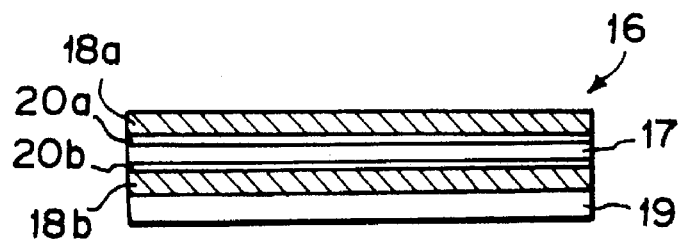
FIG. 4 is a sectional view showing a second embodiment of the stimulable phosphor sheet in accordance with the present invention.

FIG. 4 is a sectional view showing the second embodiment of the stimulable phosphor sheet in accordance with the present invention. With reference to FIG. 4, a stimulable phosphor sheet 16 comprises stimulable phosphor layers 18a and 18b, multi-layer film filters 20a and 20b, a heavy metal-containing glass plate 17, and a transparent substrate 19. The stimulable phosphor layer 18b, the multi-layer film filter 20b, the heavy metal-containing glass plate 17, the multi-layer film filter 20a, and the stimulable phosphor layer 18a are overlaid in this order on the transparent substrate 19. When the stimulable phosphor layers 18a and 18b are exposed to radiation carrying image information of an object, they store the radiation images of the object. When each of the stimulable phosphor layers 18a and 18b is exposed to a laser beam serving as the stimulating rays, it emits light in proportion to the amount of energy stored thereon during its exposure to the radiation. The multi-layer film filters 20a and 20b transmit the (red) laser beam and reflect the (blue) light emitted by the stimulable phosphor layers 18a and 18b. The heavy metal-containing glass plate 17 may be constituted of rare earth element-containing glass, or the like. The heavy metal-containing glass plate 17 has a high transparency and absorbs the low energy components of radiation. The transparent substrate 19 absorbs the laser beam and transmits the light emitted by the stimulable phosphor layers 18a and 18b.

The transparent substrate 19 may be omitted, and the heavy metal-containing glass plate 17 may also serve as the substrate for supporting the stimulable phosphor layer 18b, the multi-layer film filter 20b, the multi-layer film filter 20a, and the stimulable phosphor layer 18a. In such cases, the laser beam absorbing effects, which the transparent substrate 19 has, may be obtained by, for example, coating a laser beam cut filter in the image read-out apparatus. The transparent substrate 19 itself need not necessary be capable of absorbing the laser beam, and a multi-layer film filter for reflecting the laser beam and transmitting the light emitted by the stimulable phosphor layer may be overlaid on the surface of the transparent substrate 19.

When radiation images of an object are stored on the stimulable phosphor sheet 16, the image recording operation may be carried out in the same manner as that in the first embodiment by using the X-ray image recording apparatus shown in FIG. 2 and by locating the stimulable phosphor sheet 16 such that the stimulable phosphor layer 18a may stand facing the object 4. Specifically, the stimulable phosphor layer 18a is exposed to the X-rays 3a having passed through the object 4 containing a specific structure, which has radiation energy absorption characteristics different from the radiation energy absorption characteristics of the other parts of the object 4. In this manner, an X-ray image of the object 4 is stored on the stimulable phosphor layer 18a. After passing through the stimulable phosphor layer 18a, the X-rays 3a pass successively through the multi-layer film filter 20a, the heavy metal-containing glass plate 17, and the multi-layer film filter 20b. Thereafter, the X-rays 3a impinge upon the stimulable phosphor layer 18b. While the X-rays 3a are passing through the heavy metal-containing glass plate 17, the low energy components of the X-rays 3a are absorbed and reduced by the heavy metal-containing glass plate 17. As a result, the X-rays 3a now have an energy distribution, in which the high energy components have been emphasized. Therefore, an X-ray image of the object 4 is stored on the stimulable phosphor layer 18b with the X-rays 3a, in which the low energy components have been reduced. In this manner, two X-ray images, in which different images of the specific structure of the object 4 are embedded, are approximately simultaneously stored on the two stimulable phosphor layers 18a and 18b.

Thereafter, with the X-ray image read-out apparatus 40 shown in FIG. 3, the X-ray images are read out from the stimulable phosphor sheet 16, on which the X-ray images have been stored in the manner described above. Specifically, the stimulable phosphor sheet 16 is placed on the endless belts 49a and 49b such that the stimulable phosphor layer 18a may face up. In the same manner as that in the first embodiment, the entire area of the stimulable phosphor sheet 16 is exposed to the laser beam L.

The laser beam L, which has been irradiated to the stimulable phosphor sheet 16, impinges upon and stimulates the stimulable phosphor layer 18a of the stimulable phosphor sheet 16. When the stimulable phosphor layer 18a is exposed to the laser beam L, the exposed portion of the stimulable phosphor sheet 16 emits the light 44a in proportion to the amount of energy stored thereon during its exposure to the X-rays. The laser beam L passes through the stimulable phosphor layer 18a and thereafter successively passes through the multi-layer film filter 20a, the heavy metal-containing glass plate 17, and the multi-layer film filter 20b. The laser beam L then impinges upon the stimulable phosphor layer 18b. The stimulable phosphor layer 18b is stimulated by the laser beam L. As a result, the stimulable phosphor layer 18b emits the light 44b in proportion to the amount of energy stored thereon during its exposure to the X-rays.

On the stimulable phosphor layer 18b, the X-ray image has been stored with the X-rays, in which the low energy components have been reduced to an amount smaller than the amount of the low energy components contained in the X-rays impinging upon the stimulable phosphor layer 18a. Therefore, the amount of the emitted light 44a and the amount of the emitted light 44b are different from each other at least at the portion corresponding to the specific structure of the object 4.

The light 44a and the light 44b are emitted from the surfaces of the stimulable phosphor layer 18a and the stimulable phosphor layer 18b and propagate towards the region inside of the stimulable phosphor sheet 16. However, the emitted light is reflected by the multi-layer film filter 20b or the multi-layer film filter 20a. Therefore, the light 44a having been emitted by the stimulable phosphor layer 18a does not impinge upon the stimulable phosphor layer 18b. Also, the light 44b having been emitted by the stimulable phosphor layer 18b does not impinge upon the stimulable phosphor layer 18a. In this manner, the emitted light 44a and the emitted light 44b can be separated from each other.

The light 44a having been emitted by the stimulable phosphor layer 18a is guided by the light guide member 45a, which is located on the side of the stimulable phosphor layer 18a. The emitted light 44a, which has thus been guided by the light guide member 45a, is photoelectrically detected by the photomultiplier 46a.

Also, the light 44b having been emitted by the stimulable phosphor layer 18b passes through the substrate 19 and is guided by the light guide member 45b, which is located on the side of the substrate 19. In the same manner as that in the emitted light 44a, the emitted light 44b, which has thus been guided by the light guide member 45b, is photoelectrically detected by the photomultiplier 46b.

The laser beam L, which has impinged upon the stimulable phosphor layer 18b, is absorbed by the substrate 19 and does not impinge upon the light guide member 45b. As described above, in cases where the transparent substrate 19 is not provided, a laser beam cut filter should be located at the light guide member 45b, which is located on the side of the stimulable phosphor layer 18b, such that the laser beam L may be prevented from impinging upon the photomultiplier 46b.

As for the other effects, the same effects as those in the first embodiment can be obtained.

As described above, with the second embodiment of the stimulable phosphor sheet in accordance with the present invention, two radiation images for use in the energy subtraction processing method can be stored on a single stimulable phosphor sheet with two kinds of radiation having different energy distributions and with a single, simultaneous exposure to radiation. Also, the two radiation images for use in the subtraction processing can be read out respectively from the two surface sides of the stimulable phosphor sheet with a single irradiation of stimulating rays to one surface of the stimulable phosphor sheet, such that the two radiation images having been read out may be accurately separated from each other. Accordingly, a subtraction image having a high signal-to-noise ratio can be obtained.

The stimulable phosphor sheet in accordance with the present invention can be used in the built-in type of radiation image recording and read-out apparatuses disclosed in, for example, U.S. Pat. No. 4,851,679 and Japanese Unexamined Patent Publication No. 3(1991)-238441. The disclosed built-in type of radiation image recording and read-out apparatuses comprise a circulation and conveyance means, which circulates and conveys stimulable phosphor sheets, an image recording section, in which a radiation image of an object is recorded on a stimulable phosphor sheet, an image read-out section, in which an image signal is detected from a stimulable phosphor sheet carrying a radiation image stored thereon, and an erasing section, in which energy remaining on a stimulable phosphor sheet is erased after an image signal has been detected from the stimulable phosphor sheet.

What is claimed is:

1. A stimulable phosphor sheet comprising:

i) an energy distribution separating layer, which contains a heavy metal compound capable of absorbing low energy components of radiation, and ii) stimulable phosphor layers, which are overlaid respectively on the two surfaces of the energy distribution separating layer, and each of which emits light in proportion to the amount of energy stored thereon during its exposure to radiation when it is exposed to stimulating rays, wherein the energy distribution separating layer is colored with a coloring material, which has characteristics such that it may transmit the stimulating rays and may absorb the light emitted by each of the stimulable phosphor layers.

2. A stimulable phosphor sheet as defined in claim 1 wherein said coloring material is an oil-soluble dye.

3. A stimulable phosphor sheet as defined in claim 1 wherein said heavy metal compound is selected from the group consisting of lead carbonate, bismuth oxide, and a lanthanoid oxide.

* * * * *